United States Patent [19]

Inoue

[11] Patent Number: 5,155,714
[45] Date of Patent: Oct. 13, 1992

[54] INTERLEAVING METHOD FOR INTERLEAVED MAGNETO-OPTIC RECORDING OF A TRACK

[75] Inventor: Hideki Inoue, Kanagawa, Japan

[73] Assignee: Sony Corporation, Japan

[21] Appl. No.: 425,161

[22] PCT Filed: Feb. 18, 1989

[86] PCT No.: PCT/JP89/00164

§ 371 Date: Dec. 15, 1989

§ 102(e) Date: Dec. 15, 1989

[87] PCT Pub. No.: WO89/07823

PCT Pub. Date: Aug. 24, 1989

[30] Foreign Application Priority Data

Feb. 18, 1988 [JP] Japan .................. 63-36269

[51] Int. Cl.$^5$ ............ G11B 11/12; G11B 13/04; G11B 11/10
[52] U.S. Cl. .................. 369/13; 369/275.3; 360/59; 360/114
[58] Field of Search .......... 369/13, 275.3, 275.4; 360/59, 114, 64, 18

[56] References Cited

U.S. PATENT DOCUMENTS

| | | | |
|---|---|---|---|
| 4,858,212 | 8/1989 | Tahahashi et al. | 369/13 |
| 4,901,297 | 2/1990 | Komatsu et al. | 369/13 |
| 4,938,915 | 7/1990 | Saito | 369/13 |
| 4,949,198 | 8/1990 | Huijer et al. | 360/114 X |

FOREIGN PATENT DOCUMENTS

| | | |
|---|---|---|
| 61-198454 | 9/1986 | Japan . |
| 61-265754 | 11/1986 | Japan . |
| WO8704838 | 8/1987 | PCT Int'l Appl. . |
| 8900164 | 5/1989 | PCT Int'l Appl. . |

Primary Examiner—Stuart S. Levy
Assistant Examiner—Joseph A. Rhoa
Attorney, Agent, or Firm—Ronald P. Kananen

[57] ABSTRACT

A magneto-optic recording method of writing data in an interleaving manner on a magneto-optic recording medium by means of magnetic field modulation system. A series of data are first written on the recording medium, forming corresponding data pits, and then another series of data are written between these already written data pits. Thereby, both high density recording and high speed accessing are achieved.

20 Claims, 3 Drawing Sheets

INTERLEAVING METHOD FOR INTERLEAVED MAGNETO-OPTIC RECORDING OF A TRACK

BACKGROUND OF THE INVENTION

1. Field of the Invention

This invention relates to a recording method suitable for a magneto-optic recording system, and more particularly to a magneto-optic recording method capable of performing high speed accessing in addition to high density recording.

2. Description of the Related Art

Conventionally, magneto-optic disks have been well-known as a medium which utilizes the magneto-optic effect (Kerr effect) to perform recording and reproduction. The magneto-optic recording apparatus writes on the magneto-optic disk, and comprises a magnetic head placed over the top surface of a magneto-optic disk for generating an alternating magnetic field in response to a recording signal, and an optical pick-up placed under the magnetic head for beaming a laser onto the back surface of the magneto-optic disk. The data is written by the alternating magnetic field into the pit on the magneto-optic disk which is formed by the heat from the laser beam when the temperature of the medium rises to the Curie point or higher.

Magneto-optic recording is well-known for its high recording density, because the track density and line density are remarkably improved in comparison with the prior magnetic recording. In prior art magneto-optic recording, it is commonly known that data are written sequentially on the track.

However, with the above mentioned prior art magneto-optic recording, there remains the following problems to be solved:

(1) When data are written sequentially with a narrow space between pits, non-negligible thermal interference between the front and rear of the disk limits high density recording.

(2) When many data are sequentially written onto one track, the writing rate is limited by the frequency characteristics of the magnetic head employed and the capabilities of the magnetic head drive circuit. That is, the frequency characteristics of the magnetic head are much lower than those of the optical pick-up. This means that the speed of revolution of the magneto-optic disk has to be decreased. Therefore, a revolution waiting time for accessing data on a certain track becomes long, so that it is difficult to perform high speed accessing.

SUMMARY OF THE INVENTION

In order to overcome the above mentioned problems, an object of the present invention is to provide a magneto-optic recording method which is capable of performing high density recording as well as high speed accessing.

A magneto-optic recording method according to the present invention in order to achieve the above purposes is characterized in that in a magneto-optic recording method of writing onto a magneto-optic recording medium by a magnetic head, which performs magnetic field modulation in response to a recording signal, and an optical pick-up, a first group of data pits are recorded onto the above magneto-optic medium with a wider spacing than a predetermined pit recording spacing of data pits on the magneto-optic recording medium, and each pit of a second group of data pits are recorded between the neighboring data pits of the first group of data pits.

The data pits of the second data pit group have the same spacing as those of the first data pit group, and each data pit of the second data bit group is recorded spaced at least at the predetermined data pit recording interval from each neighboring pit of the first data pit group.

A recording signal recorded onto the first and second data pit groups may be adjusted to a frequency corresponding to the data pit recording intervals of the first and second data pit groups. Also, both the data pit recording intervals of the first and second data pit groups, and the frequency of the recording signal, may be determined in accordance with the frequency characteristics of the magnetic head.

The frequency of the recording signal is adjusted by the system clock pulse. The optical pick-up is operably controlled so as to scan separately each data pit of the first data pit group and each data pit of the second data pit group, by a separate disk revolution for the scanning of each group. The optical pick-up can also alternately scan in one sequence or revolution the interleaved data pits of both the first and second groups, namely the interleaved first and second data components. In this case it is necessary to discriminate between the first data component and the second data component. This discrimination occurs after each data pit of the first group and each data pit of the second group are read out alternately.

According to the present invention, a series of data are written first at a desired pit interval (i.e., at every nth pit along the recording track on the disk), and the frequency of the recording signal supplied to the magnetic head is divided (by n) without decreasing the revolution speed of the magneto-optic recording medium. This leads to improved frequency characteristics of the magnetic head and saves on power consumption by the drive circuit. Next, likewise, a writing is performed onto the previously non-recorded portions between the above pits. Thus, a high density recording of which the magneto-optic medium is capable is achieved as a whole. Since the neighboring pits are not sequentially written, the thermal interference is decreased. Also, since the magneto-optic recording medium maintains its high revolution speed, the revolution waiting time is decreased. Thus, access to recorded data can be performed at high speed.

DETAILED DESCRIPTION OF THE INVENTION

Figure 1:
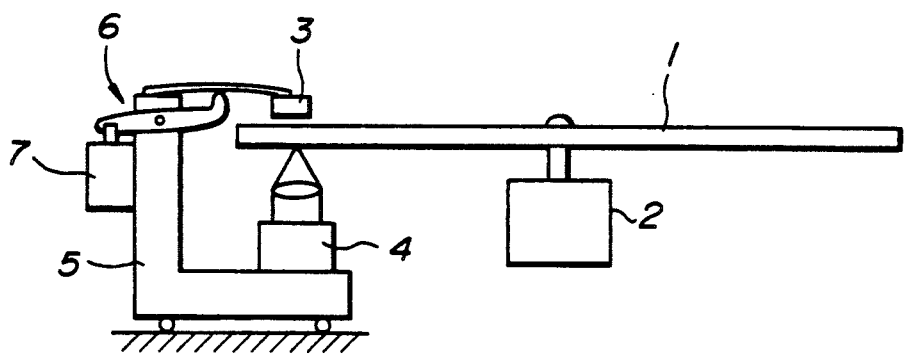
FIG. 1 shows a magneto-optic recording apparatus for use in the method of the present invention.

Referring to the drawings, an embodiment according to the present invention will be explained in detail below.

FIG. 1 is a structural view showing an embodiment of a magneto-optic recording apparatus according to the present invention. The general structure of the present invention as seen in the side plan view includes a magneto-optic disk 1 as a magneto-optic recording medium, a spindle motor 2 for rotating the magneto-optic disk 1 at, for example, CAV (constant angular velocity), a magnetic head 3 for generating a modulated alternating magnetic field according to a recording signal, an optical pick-up 4 which includes a focus means and a fine tracking means and which irradiates laser beam spots onto the disk 1 for writing, a carriage 5 which can radially position the magneto-optic head 3 and the optical pick-up 4 with a stepping motor or the like, a head lifter 6 for separating the head 3 from the magneto-optic disk 1, and a head lifter driving device 7 for generating a drive force for the head lifter 6. The magnetic head 3 is an air bearing floating type head which floats at a predetermined spacing from the disk 1 by means of the surface air flow produced with the rotation of the disk 1.

The head lifter 6 and the driving device 7 may be servo-controlled to maintain the spacing between the disk 1 and the magnetic head 3 at a constant distance. A large storage capacity of 20M byte can be accomplished under the control of such a fine tracking means with the carriage 5 at a fixed position. Yet larger capacity can be realized by a stepped feeding of the carriage 5.

Figure 2:
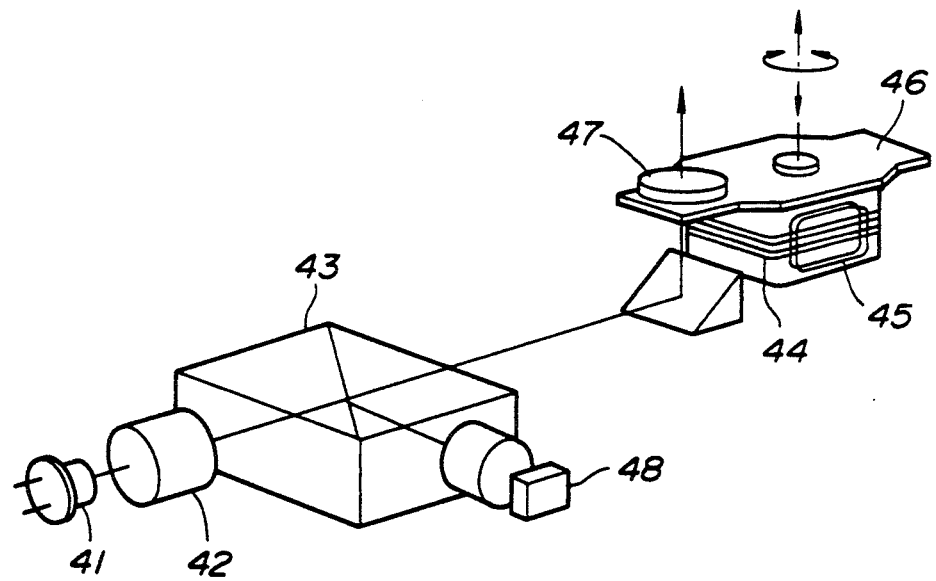
FIG. 2 is a perspective view showing the structure of an optical pick-up for use in the present invention.

FIG. 2 is a perspective view showing a structural example of an optical pick-up. The optical pick-up 4 includes at least a laser diode 41 for recording, a collimator lens 42, a deflection beam splitter 43, a two-spindle device comprising an object lens bobbin 46 which is mounted with a focus coil 44 and a tracking coil 45, an object lens 47 for irradiating the laser beam spot onto an optical disk 1 (shown in FIGS. 1 and 3) mounted on the two-spindle device and a detector 48 for receiving a reflected laser beam from the disk 1 to detect a servo signal or the like. The reproduction optical system such as a light detector is omitted. However, the laser beam is focus-controlled, and is tracked controllably. When the magnetic recording layer on the disk 1 is at a temperature equal to or above the Curie point, it is vertically magnetized by the magnetic field from the magnetic head 3, which has a strength which has no effect on the disk 1 at a normal temperature.

A tracking servo function is performed by a clock pit or other physically distinguishable means which is previously formed onto the magneto-optic disk 1 for this purpose.

Figure 3:
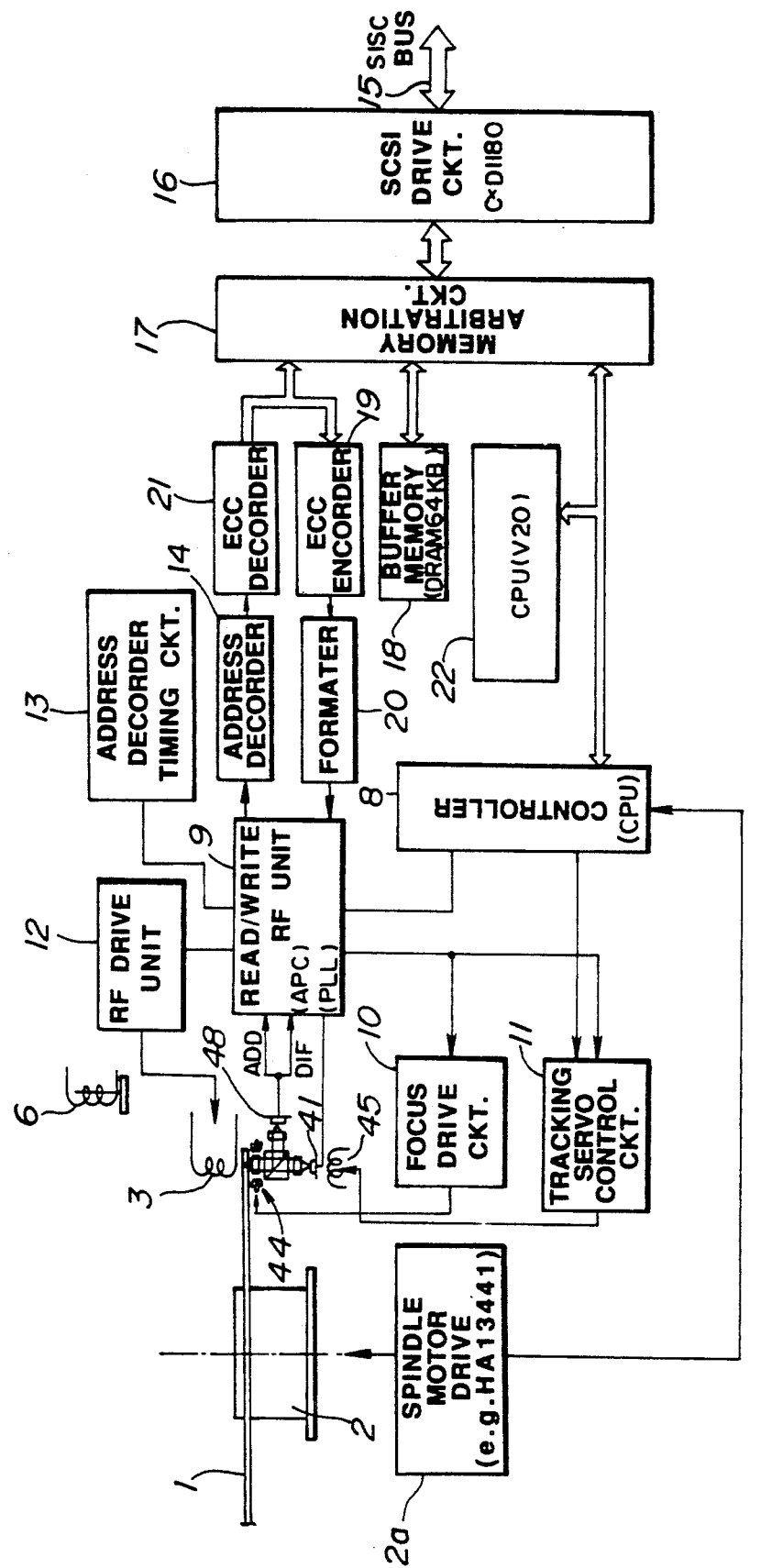
FIG. 3 is a block diagram showing a control system of a magneto-optic recording apparatus for practicing the method of the present invention.

FIG. 3 is a block diagram showing a structural example of the control system of the above mentioned magneto-optic recording apparatus. The controller 8 comprises a system control CPU for performing a timing indication control and a servo control for a fine tracking to each block. The disk 1 is rotated at a high speed or at a constant angular speed, for example 3000 rpm, by the spindle motor drive 2a and the spindle motor 2 under the command of the controller 8. The read/write RF unit 9 drives the laser diode 41 using the automatic power control (APC) circuit and the phase locked loop (PLL) of the optical pick-up 4, and detects the reading signal for the servo signal and the recording signal with the addition and subtraction signal detected by the detector 48.

The focus drive circuit 10 and the tracking servo control circuit 11 control the focus coil and the tracking coil 45 of the optical pick-up 4 in accordance with the above servo signal, to perform focusing and tracking operations, thus holding the laser beam spot in a suitable and recordable condition. The laser diode 41 is intermittently driven to control the timing of light emission by means of the phase locked loop. The timing frequency is within a range which covers the frequency characteristics of the magnetic head 3.

A recording signal is provided to the magnetic head 3 by way of the RF drive unit 12, in synchronism with the above frequency. Then, the writing is performed into alternately spaced pits at a high speed in correspondence with the revolution of the disk 1. The address decoder timing circuit 13 is a timing circuit for separating and detecting addresses of the data pits being written from the reading signal. The reading signal is read for the spaced pits and at the same intervals as those for the writing, and then is provided through the address decoder 14.

The recording signal is externally input into the memory arbitration circuit 17 by way of, for example, the SCSI bus 15 and the SCSI drive circuit 16, and is stored temporarily into the buffer memory 18. Sequentially, a series of data are subjected to parallel to serial conversion, and are formatted into predetermined data by adding an ECC (error correction) code through the formatter 20. Then the series of data are input to the read/write RF unit 9 as an NRZ code.

When the controller 8 issues the command for the next writing operation, the next series of data are written in the same way as above, but into an empty pit between each pair of the data pits formed by the first writing, whereby a high density recording can be established as a whole.

The disk 1 may be of a concentric circle type or a spiral type. In a spiral type disk, a one track return jumping is performed on a writing (or reading) of a next series of data.

After the ECC decoder 21 checks and corrects for any error, a reading signal is input to the memory arbitration circuit 17. The corrected signal is stored temporarily into the buffer memory 18, and then it is sequentially transferred to outside circuits as parallel data through necessary procedures. At this time, the CPU 22 controls the internal/external data. The CPU 22 and the controller 8 may be integrated into one unit. The head lifter 6 is driven by the controller 8 so as to lift the magnetic head 3 when the operation stops.

In reference to the above mentioned magneto-optic recording apparatus, an example of a magneto-optic recording method according to the present invention will be described below.

Figure 4:
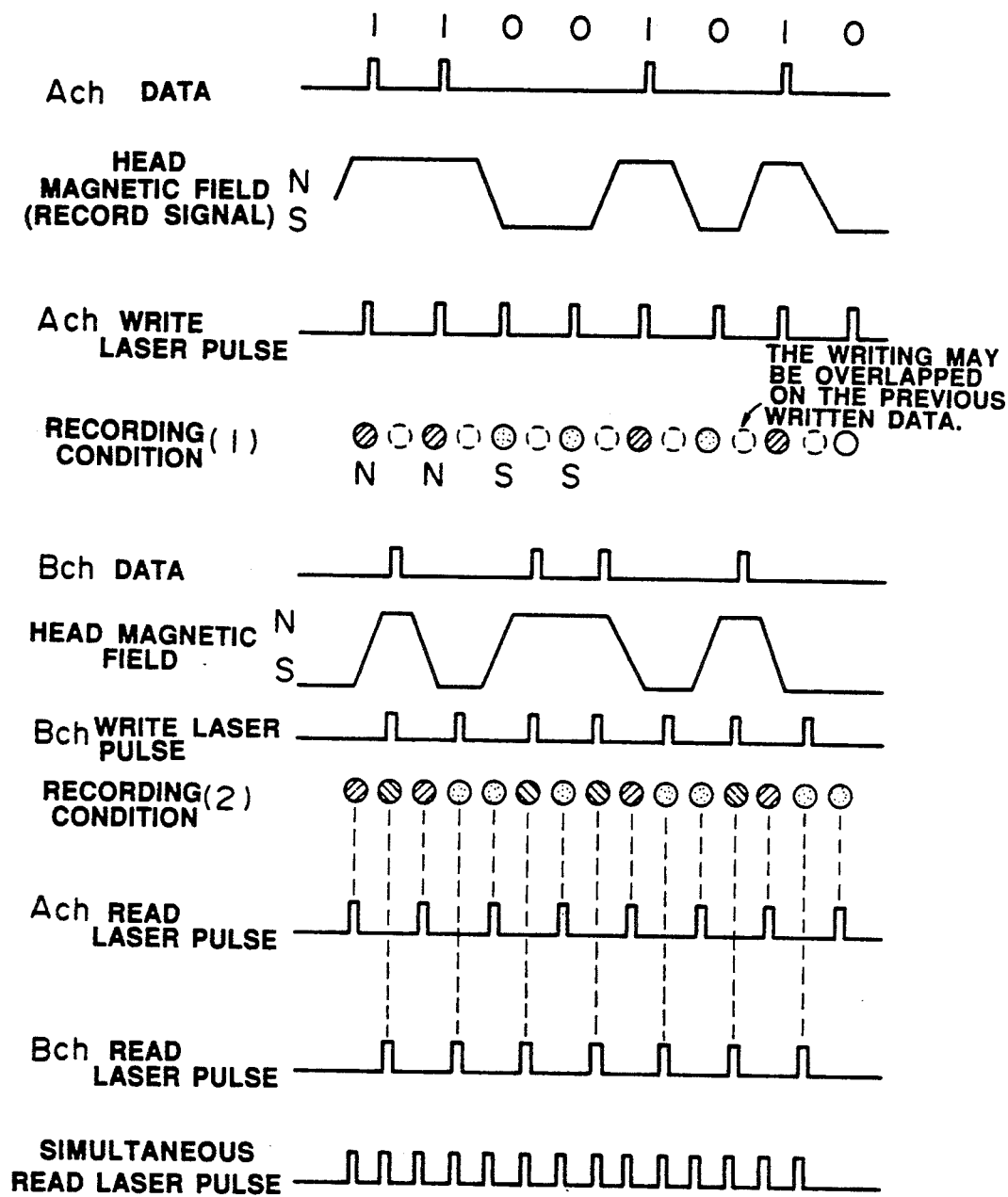
FIG. 4 is a view for explaining one embodiment of the method according to the present invention.

FIG. 4 is a view for the purpose of explaining an example embodiment of the process of the present invention. The first series of writing data are the Ach (A channel) data, and the next series of data are the Bch (B channel) data. It will be explained as an example that the Bch data are written to the pits between the Ach data pits, namely that the Ach data are written into every other pit along the recording line.

The recording signal for the NRZ code is produced from the Ach data. The digit "1" or "0" of the data corresponds to the direction of the magnetic field out of the magnetic head, which is inverted synchronously with the laser pulse for the Ach data writing. In the case of a continuous servo, the writing laser pulse is emitted in such a timing that every pit for the Ach channel data is written (recording condition (1)), by being synchronized in phase to the clock pit which is stored onto the disk 1 as a physical form variation. The writing may be overlapped on previously written data.

Similarly, on the completion of the Ach series of data writing, a magnetic field modulation by the magnetic head is performed on the basis of the Bch data while the Bch writing laser pulse is emitted, to write the Bch data in such as timing that it is written to the pits between the Ach data pits (recording condition (2)). Such a spaced writing operation decreases the thermal interference between contiguous pits, and reduces the power consumed for driving the magnetic head, as a result of a lower frequency being used.

Next, a method for reading from the disk in the above recording condition (2) will be explained. Like for the writing, a series of laser pulses is irradiated with a timing corresponding to the positions of the Ach data pits, in synchronism to the clock pits or the like, to read the Ach data. Next, a series of laser pulses is irradiated with a timing corresponding to the positions of the Bch data pits between the Ach data pits, to read the Bch data.

In order to perform higher speed access, a method may be adopted that after a series of laser pulses is irradiated to all the pits to read both the Ach or Bch data simultaneously, a control circuit separates the Ach and Bch data.

According to the above embodiment, a bit of data is recorded every two pits during each revolution of the disk. Of course, a bit of data may be recorded every three or more pits, to record data over three or more channels. As described above, various applications may be obtained by modifications according to the concept of the present invention.

As is obvious from the above explanation, a magneto-optic recording method or apparatus according to the present invention can, by the spaced writing or interleaving method of the present invention, simultaneously overcome two major problems of the prior art. One is the frequency characteristics of the magnetic head limiting practical high density recording or high speed accessing, and the other is that of thermal interference between contiguous pits. The recording method and apparatus of the present invention can outperform the capacity/volume of prior art magnetic recording.

I claim:

1. A magneto-optic recording method for writing data into sequential data pits of a recording track on a magneto-optic medium with an optical pick-up and a magnetic head performing a magnetic field modulation in response to a recording signal, said data pits being nominally spaced at a predetermined interval along said recording track, the method comprising
    recording respective bits of said data into a first group of said data pits, said data pits of said first group being a recording track on said magneto-optic recording medium to be spaced at a wider interval than said predetermined interval, and
    recording respective bits of said data into at least a second group of said data pits, each data pit of said second group lying between a respective contiguous pair of said data pits of said first group.

2. A method according to claim 1, wherein
    said pits of said second group are spaced at the same interval as those of said first group, and
    each said data pit of said second group is recorded so as to be spaced from each of a respective contiguous pair of said data pits of said first group at said predetermined interval.

3. A method according to claim 2, wherein said optical pick-up is controlled in timing so as to scan separately each said data pit of said second group recorded between each said data pit of said first group, in a first scan, and each said data pit of said first group, in a second scan following said first scan.

4. A method according to claim 2, wherein said optical pick-up scans sequentially in alternating order each said data pit of said first group and each respective sequential one of said data pits of said second group.

5. A method according to claim 4, wherein said optical pick-up reads alternately a data pit of said first group and the respective following one of said data pits of said second group, and continues in this alternating order to read all the bits of both said first and second groups, and
    then discriminates between said read bits from said first and second groups to output separate corresponding first and second data components, said first data component having been stored in said data pits of said first group and said second data component having been stored in said data pits of said second group.

6. A method according to claim 2, wherein a recording signal recorded in said first and second groups is adjusted to a frequency corresponding to said recording interval.

7. A method according to claim 6, wherein said optical pick-up is controlled in timing so as to scan separately eech said data pit of said second group recorded between each said data pit of said first group, in a first scan, and each said data pit of said first group, in a second scan following said first scan.

8. A method according to claim 6, wherein said optical pick-up scans sequentially in alternating order each said data pit of said first group and each respective sequential one of said data pits of said second group.

9. method according to claim 6, wherein said recording interval and said frequency of said recording signal is determined in accordance to frequency characteristics of said magnetic head.

10. A method according to claim 8, wherein said optical pick-up reads alternately a data pit of said first group and the respective following one of said data pits of said second group, and continues in this alternating order to read all the bits of both said first and second groups, and
    then discriminates between said read bits from said first and second groups to output separate corresponding first and second data components, said first data component having been stored in said data pits of said first group and said second data component having been stored in said data pits of said second group.

11. A method according to claim 9, wherein said optical pick-up is controlled in timing so as to scan separately each said data pit of said second group recorded between each said data pit of said first group, in a first scan, and each said data pit of said first group, in a second scan following said first scan.

12. A method according to claim 9, wherein said optical pick-up scans sequentially in alternating order each said data pit of said group and each respective sequential one of said data pits of said second group.

13. A method according to claim 12, wherein said optical pick-up reads alternately a data pit of said first group and the respective following one of said data pits of said second group, and continues in this alternating order to read all the bits of both said first and second groups, and
    then discriminates between said read bits from said first and second groups to output separate corresponding first and second data components, said first data component having been stored in said data pits of said first group and said second data component having been stored in said data pits of said second group.

14. A method according to claim 9, wherein said frequency of said recording signal is controlled by a clock pulse.

15. A method according to claim 1, wherein said optical pick-up is controlled in timing so as to scan separately each said data pit of said second group recorded between each said data pit of said first group, in a first scan, and each said data pit of said first group, in a second scan following said first scan.

16. The method according to claim 15, wherein said second scan provides a first data component that was stored in said data pits of said first group and said first scan provides a second data component that was stored in said data pits of said second group, said first and second data components having been written into said data pits of said first and second groups in respective different revolutions of said recording medium.

17. A method according to claim 1, wherein said optical pick-up scans sequentially in alternating order each said data pit of said first group and each respective sequential one of said data pits of said second group.

18. A method according to claim 17, wherein said optical pick-up reads alternately a data pit of said first group and the respective following one of said data pits of said second group, and continues in this alternating order to read all the bits of both said first and second groups, and then discriminates between said read bits from said first and second groups to output separate corresponding first and second data components, said first data component having been stored in said data pits of said first group and said second data component having been stored in said data bits of said second group.

19. The method according claim 1, comprising recording each said data pit by a magnetic field perpendicular to the plane of said magneto-optic recording medium.

20. The method according to claim 1, comprising
recording said data pits of said first group in a first recording condition wherein their writing overlaps onto previously written data in the adjoining ones of said data pits of said second groups, and
recording said data pits of said second group in a second recording condition which does not overlap onto data previously written, in said recording in said first recording condition, in the adjoining ones of said data pits of said first group.

* * * * *